March 14, 1967 J. E. RAMSEY, JR., ETAL 3,309,152
MAGNETICALLY-SUPPORTED-ROTOR DEVICES
Filed Aug. 9, 1963 2 Sheets-Sheet 2
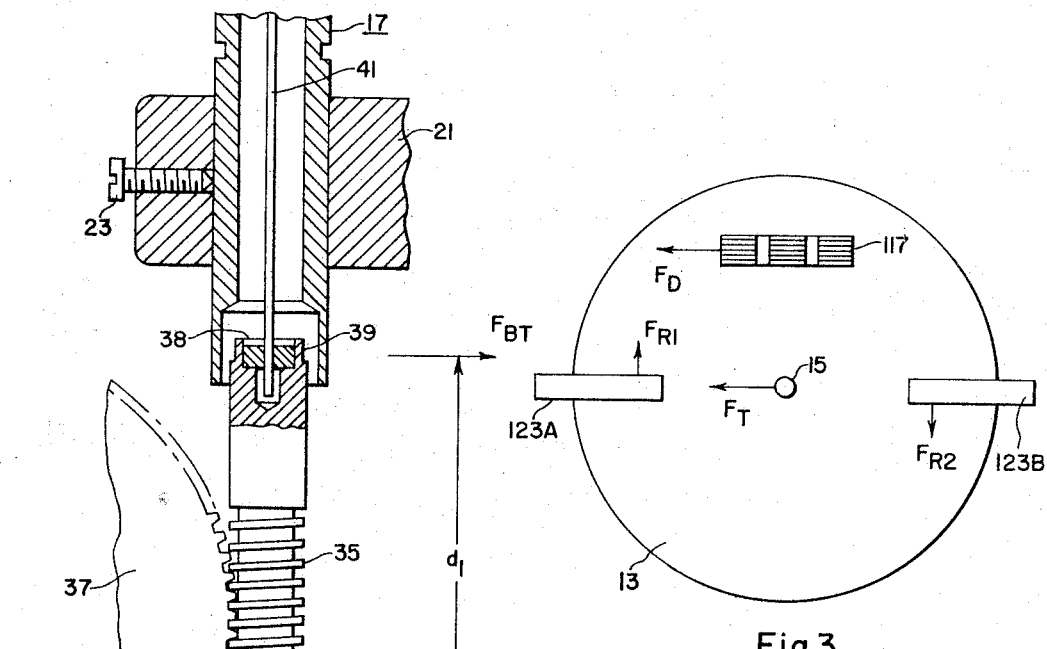
Fig.3.
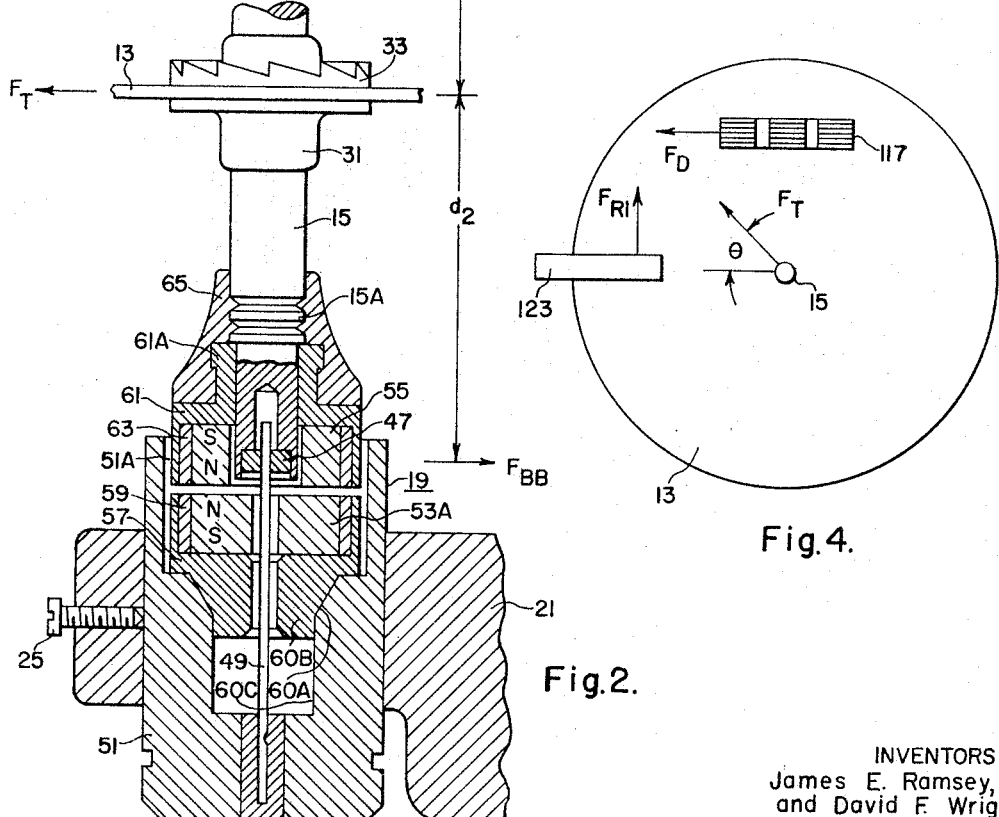
Fig.2.
Fig.4.
INVENTORS
James E. Ramsey, Jr.
and David F. Wright
BY
ATTORNEY 3,309,152
MAGNETICALLY-SUPPORTED-ROTOR DEVICES
James E. Ramsey, Jr., Raleigh, and David F. Wright,
House Creek Township, Wake County, N.C., assignors
to Westinghouse Electric Corporation, Pittsburgh, Pa.,
a corporation of Pennsylvania
Filed Aug. 9, 1963, Ser. No. 301,000
7 Claims. (Cl. 308—10)

This invention relates to magnetically-supported-rotor devices and it has particular relation to integrating meters of the induction type which employ magnetically-supported rotors.

The invention is applicable to various devices employing magnetically-supported rotors. It is particularly desirable for integrating meters of the induction type and will be described below as incorporated in a watthour meter.

Watthour meters employing magnetically-supported rotors have been available for many years. Such meters have been so designed that the side-thrust forces and the vibration forces acting between the stator and rotor structures were reduced to a minimum. To this end, a meter would be provided with a pair of damping magnets located on opposite sides of the axis of the rotor structure with polarities selected for minimum vibration of the rotor structure, or a U-shaped damping magnet structure would be employed.

In accordance with the invention a magnetic mounting for the rotor structure of a meter is employed which permits substantial simplification of the damping magnet assembly employed for the meter. In a preferred embodiment of the invention spaced guide means resiliently constrain a rotor structure against transverse motion relative to an associated stator structure but permit rotation of the rotor structure about a vertical axis. A magnetic mounting is provided which supports the rotor structure vertically but permits with the guide means limited horizontal translation of the rotor structure relative to the stator structure. This materially increases the tolerance of the meter for vibration and side thrust. The practice of the invention permits the adoption of a single C-shaped damping magnet in place of the pair of C-shaped damping magnets previously employed.

It is therefore an object of the invention to provide an improved magnetically-supported-rotor device.

It is also an object of the invention to provide an integrating induction motor measuring device having a magnetically-supported-rotor structure and only one C-shaped damping magnet.

It is an additional object of the invention to provide an integrating induction-motor measuring device having a rotor structure supported vertically by magnets acting in repulsion and having a side-thrust-producing damping magnet arrangement.

Other objects of the invention will be apparent from the following description taken in conjunction with the accompanying drawings, in which:

FIG. 2 is a view in side elevation with parts broken away showing the rotor structure of the meter of FIG. 1 together with its associated mounting;

FIG. 3 is a view in top plan with parts broken away of a prior art integrating meter; and FIG. 4 is a view in top plan with parts broken away of the meter of FIG. 1.

Figure 1:
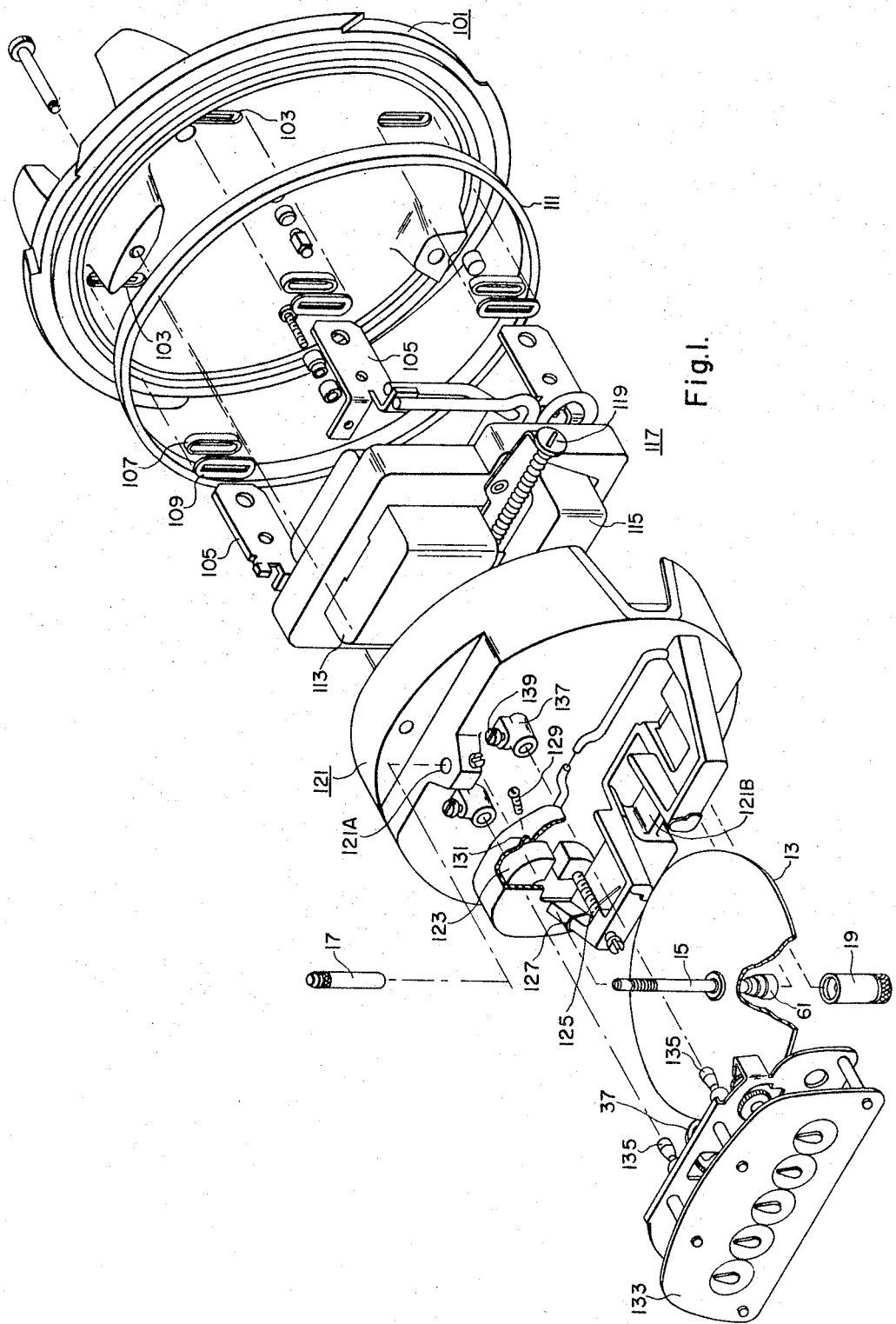
FIGURE 1 is an exploded view in perspective showing an integrating meter embodying the invention.

Referring to the drawings FIGURE 1 shows an integrating meter which may be employed for measuring various quantities such as varhours or watthours. The meter includes a base 101 which is constructed of an insulating material such as a phenolic resin. The base has four slots 103 through which pass contact blades 105 for the purpose of establishing connections between electrical components of the meter and an external circuit from which the meter is to be energized. Each of the contact blades is surrounded by a gasket 107 constructed of rubber or other resilient material and partially received in an enlarged part of a slot 103. Each of the gaskets 107 is compressed around the contact blade and the associated portion of the plate 101 in order to seal any openings between the contact blade and the base 101. A gasket 111 of ring shape engages the base 101 and the open end of a cup-shaped cover (not shown) to establish an enclosure for protecting the working parts of the meter.

The contact blades 105 are employed for conducting currents to the voltage winding 113 and the current windings 115 of an electromagnet 117 which may be of conventional construction. It will be understood that when the voltage winding 113 is energized in accordance with the voltage of an associated alternating current circuit and the current windings 115 are energized in accordance with current flowing in such circuit a shifting magnetic field is produced in an air gap formed in the electromagnet for the purpose of applying torque to an electroconductive armature 13 of a rotor structure. A conventional light-load adjuster 119 may be provided for adjusting the magnitude of the load torque applied by the electromagnet to the armature.

The portions of FIGURE 1 which thus far have been specifically described are well known in the art and may be of conventional construction.

A frame 121 is secured to the electromagnet 117. This frame may be constructed of any suitable nonmagnetic material such as an aluminum-base die-casting alloy. The frame 121 carries two brackets 121A and 121B for receiving the upper-bearing assembly 17 and the lower-bearing assembly 19 which mount the rotor structure of the meter for rotation relative to the stator structure.

The rotor structure and its mounting are shown in greater detail in FIGURE 2. To facilitate a discussion of this figure the following components are listed:
  13 electroconductive disc
  15 shaft
  17 upper bearing assembly
  19 lower bearing assembly
  35 worm
  37 worm wheel
  39 ring bearings
  47 ring bearings
  41 pins
  49 pins
  53A lower permanent magnet
  55 upper permanent magnet
  59, 63 soft magnetic rings The components of FIGURE 2 are similar to the components bearing similar reference characters in FIGURE 2 of the copending David F. Wright patent application, Serial No. 11,335, filed February 26, 1960, now patent 3,143,704, except that the lower permanent magnet 53A of the present FIGURE 2 has a smaller internal diameter than the lower permanent magnet 53 shown in FIG. 2 of the aforesaid Wright application.

The pins 41 and 49 are of resilient material such as stainless steel and have their free ends received in the ring bearings 39 and 47 which may be constructed of graphite. The pins mount the shaft for rotation about the axis of the pins. In response to a force applied to the shaft 15 in a transverse direction the free ends of the pins deflect to permit transverse movement of the shaft. Upon removal of the force the pins return to their illustrated positions. With the polarities of the permanent magnets 55 and 53A as shown in FIGURE 2 by the polarity markings N for north pole and S for south pole a repulsion magnetic force is developed between the permanent magnets which supports the rotor structure slightly above the lower permanent magnet 53A. The field configurations of the permanent magnet are substantially flat in a horizontal direction and consequently it is permissible to move the rotor structure in a transverse direction relative to the lower permanent magnet 53A.

Inasmuch as the structure shown in FIGURE 2 is essentially the same as that shown in FIGURE 2 of the aforesaid Wright patent application reference may be made to such patent application for a more detailed discussion of the structure.

Returning to FIGURE 1 it will be noted that the frame 121 is provided with a pocket for receiving a permanent magnet 123 which is C-shaped and which is positioned to straddle the edge of the armature 13. The magnet 123 may be mounted in the frame in any suitable manner such as that shown in the Witte Patent 3,054,953. It will be understood that the permanent magnet 123 directs magnetic flux through the armature 13 for the purpose of providing eddy current damping in a manner well understood in the art.

In order to provide for full-load adjustment of the meter a screw 125 constructed of soft magnetic material is mounted in a threaded opening provided in an extension of the frame 121. Rotation of the screw carries it towards and from a pole of the permanent magnet 123 for the purpose of adjusting the effective damping provided by the permanent magnet. A spring wire 127 is mounted with its ends engaging portions of the frame 121 and its center biased against the screw 125 to hold the screw in any position to which it is adjusted. The permanent magnet 123 may be constructed of a suitable high-coercive permanent-magnet material such as Alnico.

If a greater range of adjustment in the damping provided by the permanent magnet is desired a soft-magnetic screw 129 may be positioned in a threaded opening 131 provided in the frame 121 to position the screw adjacent the pole of a permanent magnet in order to decrease the damping provided by the permanent magnet still further.

A conventional register 133 driven by the worm wheel 37 is provided with mounting pins 135 which are positioned for reception in sockets 137 provided in the frame 121. Set screws 139 are associated with the sockets for the purpose of securing the register in mounted position. It will be understood that the register counts the number of rotations of the shaft 15 and may be calibrated to read directly a measured quantity such as kilowatt hours.

As shown in FIG. 3 it has been common practice in prior-art meters having a magnetically-supported rotor structure to employ two permanent magnets 123A and 123B for damping purposes. In FIGURE 3 the electromagnet 117 is employed for applying to the armature 13 a driving force $F_D$ which urges the armature in a counterclockwise direction relative to the stator structure. The lefthand damping magnet 123A produced a retarding force $F_{R1}$ for the armature which is directed upwardly as viewed in FIGURE 3. The right-hand damping magnet 123B produces a retarding force $F_{R2}$ which is directed downwardly as viewed in FIGURE 3. Assuming that the permanent magnets 123A and 123B are similar and that they are symmetrically located on opposite sides of the shaft 15 it follows that the retarding forces $F_{R1}$ and $F_{R2}$ form a couple and that this couple applies no side thrust to the shaft 15. The total force applied to the shaft 15 is represented by a vector $F_T$ which is equal in value to the driving force $F_D$ and which is similarly directed. Furthermore, by properly poling the damping magnets 123A and 123B it is possible to minimize vibration forces which result from the interaction of the fields produced by these damping magnets with the currents induced in the armature by the electromagnet 117.

Heretofore, it was considered important to reduce side thrust and vibration forces acting on the shaft to a minimum. This was due to the fact that early studies of a magnetic mounting wherein inner and outer concentric magnets were employed essentially in attraction at the upper end of the shaft indicated that the magnetic mounting would not operate properly if the inner magnet moved in a transverse direction relative to the outer magnet. It was found necessary to prevent transverse motion of this inner magnet, as by use of a stiff guide pin. To handle the vibration and side thrust forces the armature was moved to the end of the shaft remote from the magnetic mounting, in these early studies to the lower end of the shaft and mechanical bearing for the lower end of the shaft was allowed to move in a transverse direction in an attempt to absorb the increased vibration and side thrust forces applied thereto. This resulted in a high loading of the mechanical bearing.

In the embodiment of FIGURE 1 a single damping magnet 123 is employed. As shown in FIGURE 4 this damping magnet 123 produces a damping force $F_{R1}$ which is double that produced by the damping magnet 123A of FIGURE 3.

If the damping magnet 123 of FIGURE 4 were located at a position displaced 180° about the shaft 15 from the electromagnet 117 the total force $F_T$ acting on the shaft 15 would be equal to the arithmetic sum of the driving force $F_D$ and the retarding force $F_{R1}$. As the damping magnet 123 is moved towards the electromagnet 117 the total force $F_T$ decreases. It has been found that from a construction standpoint it is desirable to locate the damping magnet 123 approximately 90° from the electromagnet 117 measured angularly about the shaft 15. The total force $F_T$ acting on the shaft 15 then is equal to the vector sum of the driving force $F_D$ and the retarding force $F_{R1}$ and this vector sum is materially less than the arithmetic sum previously discussed.

As previously pointed out an attraction-type magnetic mounting which has been extensively employed for meters has required a design which would prevent relative transverse motion of the magnets employed in the magnetic mounting. For such a mounting the meter armature would be moved as far as practicable away from the magnetic mounting in order to reduce the side-thrust force applied to the guide bearing adjacent the magnetic mounting and this guide bearing would have a stiff pin to keep the magnets concentric. As a result the side-thrust force applied to the guide bearing remote from the magnetic mounting, for example, was approximately 6½ times as large as that applied to the guide bearing adjacent the magnetic mounting. In effect the side-thrust force applied through the armature tended to rotate the meter shaft in a vertical plane about the end of the shaft adjacent the magnetic mounting. Because the attraction-type magnetic mounting could not tolerate relative transverse movement of its magnets, and because of the high loading applied to the guide bearing remote from the magnetic mounting side-thrust forces had to be kept to a minimum. Consequently, such a meter employed a damping-magnet system which would result in low side thrust.

With the magnetic mounting of the repulsion type shown in FIGURE 2 we have found that substantial relative transverse motion of the permanent magnets 53A and 55 is entirely feasible. As a result the armature 13 can be located more centrally in order to distribute side-thrust forces more uniformly between the top and bottom guide bearings.

In a desirable embodiment of the invention the armature 13 is so located and the resilient pins 41 and 49 are so constructed that a side thrust force applied through the armature 13 results in a bodily transverse motion of the shaft 15 relative to the stator structure. That is, a side thrust force applied through the armature 13 moves the upper and lower ends of the shaft substantially equally.

To illustrate suitable parameters the distance $d_1$ (FIG. 2) from the armature to the line of action of the counter force $F_{BT}$ at the top guide bearing in a direction parallel to the shaft may be 1.665 inches whereas the distance $d_2$ from the armature to the line of action of the counter force $F_{BB}$ acting at the lower or bottom guide bearing is .730 inch. By proper selection of the resiliences and lengths of the pins 41 and 49 the force $F_T$ results in substantially equal movements of the ends of the shaft 15 in the direction of the force $F_T$, and thus the shaft remains vertical as it moves. The counter force $F_{BB}$ readily may be maintained at less than three times the counter force $F_{BT}$. In a meter actually constructed the forces $F_{BT}$ and $F_{BB}$, respectively, were 0.5 and 1.2 grams when the meter operated at rated capacity. Even when the meter operated at 667% of rated capacity the counter force $F_{BB}$ was still far below the maximum recommended loading for steel and graphite bearings. Moreover, vibration forces due to interaction of the field of the damping magnet 123 with alternating currents induced in the armature 13 by the electromagnet 117 are more uniformly divided between the top and bottom side bearings. This results in low bearing loadings and low noise.

In addition to the material reduction in cost resulting from the adoption of a single C-shaped damping magnet other advantages are obtained. The single piece construction of the C-shaped damping magnet assures a constant air gap dimension. In addition, the use of a single or powerful damping magnet permits a greater range of full-load adjustment by a single screw 125. Another important advantage is that the compact construction afforded by the single damping magnet substantially increases the space available for pickup and test devices commonly employed with meters.

Although the invention has been described with reference to certain specific embodiments thereof numerous modifications falling within the spirit and scope of the invention are possible.

We claim as our invention:

1. In an alternating current induction motor device, a stator structure and a rotor structure mounted for rotation relative to the stator structure, said rotor structure comprising a vertical shaft having a vertical axis, an electroconductive disc armature mounted concentrically on the shaft intermediate the ends of the shaft, first guide means mounting a first end of the shaft for rotation about the axis relative to the stator structure, second guide means mounting a second end of the shaft for rotation about the axis relative to the stator structure, each of said guide means comprising a ring bearing on one of said structures and a resilient pin having a first terminus secured to the other of said structures received in said ring bearing, said ring bearing and pin being concentric relative to said axis for permitting rotation of said shaft relative to the stator structure while resiliently opposing deflection of the shaft in a transverse direction relative to the axis, said guide means and armature being so positioned and proportioned that a force applied transversely to said shaft at the position of said armature substantially equally deflects both ends of said shaft in the direction of said force relative to the stator structure; a first permanent magnet carried by said rotor structure, a second permanent magnet carried by said stator structure adjacent and below said first permanent magnet, said permanent magnets being concentric about said axis and being polarized to develop a repulsion magnetic force acting vertically therebetween to support magnetically the rotor structure relative to the stator structure while leaving the structures substantially free for relative excursion in a horizontal direction, electroresponsive drive means carried by said stator structure and effective when energized for applying to the armature a shifting magnetic field which produces a driving torque acting between the armature and the stator structure to produce relative rotation therebetween about the axis, and a C-shaped permanent magnet straddling the edge of the armature at a position displaced less than 180° from the drive means angularly about the axis to produce an eddy-current damping force acting between the armature and the stator structure, said C-shaped permanent magnet constituting the only damping magnet acting on the armature.

2. The invention of claim 1 wherein the motor device is a watthour meter, in combination with adjusting means for adjusting the damping force, said adjusting means comprises a soft magnetic member mounted for adjustment towards and from a pole of said permanent magnet.

3. The invention of claim 2 wherein said guide means and armature are so positioned and proportioned that a force applied transversely to said shaft at the position of said armature produces a counter force at each of said guide means which does not exceed three times the corresponding counter force at the other of said guide means.

4. In an alternating current induction motor device, a stator structure and a rotor structure mounted for rotation relative to the stator structure, said rotor structure comprising a vertical shaft having a vertical axis, an electroconductive disc armature mounted concentrically on the shaft intermediate the ends of the shaft, first guide means mounting a first end of the shaft for rotation about the axis relative to the stator structure, second guide means mounting a second end of the shaft for rotation about the axis relative to the stator structure, a first permanent magnet carried by said rotor structure, a second permanent magnet carried by said stator structure adjacent and below said first permanent magnet, said permanent magnets being concentric about said axis and being polarized to develop a repulsion magnetic force acting vertically therebetween to support magnetically the rotor structure relative to the stator structure, electroresponsive drive means carried by said stator structure and effective when energized for applying to the armature a shifting magnetic field which produces a driving torque acting between the armature and the stator structure to produce relative rotation therebetween about the axis, and a C-shaped permanent magnet straddling the edge of the armature at a position displaced less than 180° from the drive means angularly about the axis to produce an eddy-current damping force acting between the armature and the stator structure, said C-shaped permanent magnet constituting the only damping magnet acting on the armature, and means for adjusting the damping force comprising a soft magnetic member, and means mounting the soft magnetic member at a position displaced from the permanent magnet for adjustment towards and from one pole of the C-shaped permanent magnet.

5. In an alternating current induction watthour meter device, a stator structure and a rotor structure mounted for rotation relative to the stator structure, said rotor structure comprising a vertical shaft having a vertical axis, an electroconductive disc armature mounted concentrically on the shaft intermediate the ends of the shaft, first guide means mounting a first end of the shaft for rotation about the axis relative to the stator structure, second guide means mounting a second end of the shaft for rotation about the axis relative to the stator structure, a first permanent magnet carried by said rotor structure, a second permanent magnet carried by said stator structure adjacent and below said first permanent magnet, said permanent magnets being concentric about said axis and being polarized to develop a repulsion magnetic force acting vertically therebetween to support magnetically the rotor structure relative to the stator structure, a pair of soft magnetic rings each concentrically surrounding a separate one of the permanent magnets and acting with the associated permanent magnet to establish a magnetic field which is substantially flat in a plane transverse to the axis, electroresponsive drive means carried by said stator structure and effective when energized for applying to the armature a shifting magnetic field which produces a driving torque acting between the armature and the stator structure to produce relative rotation therebetween about the axis, and a C-shaped permanent magnet straddling the edge of the armature at a position displaced less than 180° from the drive means angularly about the axis to produce an eddy-current damping force acting between the armature and the stator structure, said C-shaped permanent magnet constituting the only damping magnet acting on the armature, and means for adjusting the damping force comprising a soft magnetic member, and means mounting the soft magnetic member at a position displaced from the permanent magnet for adjustment towards and from one pole of the C-shaped permanent magnet.

6. In an induction watthour meter device, a stator structure, a rotor structure, bearing means mounting the rotor structure for rotation about a vertical axis relative to the stator structure, said bearing means comprising magnetic means developing a magnetic field acting between the structures to maintain the rotor structure in a predetermined position relative to the stator structure in a direction parallel to the axis, and resilient guide means yieldably constraining the rotor structure against substantial movement relative to the stator structure in a direction transverse to the axis, one of said structures comprising an electroconductive member concentric about said axis and the other of said structures comprising an eddy-current damping device cooperating with the electroconductive member to develop an induction-eddy current side-thrust-producing damping force acting between the members to damp rotation of the structures relative to each other, said guide means providing compliance such that a force acting transversely relative to said axis between the structures at the position of said electroconductive member produces substantially a relative movement of translation of said structures in the direction of said force while maintaining said axis vertical, said electroconductive member comprising a disc and said damping device comprising a C-shaped damping magnet straddling the edge of the disc, said C-shaped damping magnet constituting the only damping magnet acting on the disc, and means for adjusting the damping force comprising a soft magnetic member adjustable relative to said damping magnet to modify the damping field thereof.

7. An induction watthour meter device as claimed in claim 6 wherein said adjusting means comprises a soft magnetic screw in threaded engagement with the stator structure for movement towards and from a pole of said damping magnet in response to rotation of the screw about its axis.

References Cited by the Examiner
UNITED STATES PATENTS

| | | | |
|---|---|---|---|
| 2,237,142 | 4/1941 | Holtz | 324—152 X |
| 2,252,483 | 8/1941 | Green | 324—152 |
| 2,254,698 | 9/1941 | Hansen | 308—10 |
| 2,315,408 | 3/1943 | Faus | 308—10 |
| 2,869,934 | 1/1959 | Milligan | 308—10 |
| 2,940,044 | 6/1960 | Warsaw | 324—152 X |
| 3,107,948 | 10/1963 | Lovegrove | 308—10 |
| 3,109,962 | 11/1963 | Sonnemann | 324—152 X |
| 3,114,582 | 12/1963 | Milligan et al. | 308—10 |
| 3,141,102 | 7/1964 | Steingroever | 324—152 X |

FOREIGN PATENTS

| | | |
|---|---|---|
| 678,662 | 9/1952 | Great Britain. |

MILTON O. HIRSHFIELD, *Primary Examiner.*

ORIS L. RADER, *Examiner.*

J. J. SWARTZ, *Assistant Examiner.*